(12) United States Patent
Chu et al.

(10) Patent No.: US 9,979,184 B2
(45) Date of Patent: May 22, 2018

(54) PROTECTION CIRCUIT FOR OUTPUT DEVICE

(71) Applicant: TAIWAN SEMICONDUCTOR MANUFACTURING CO., LTD., Hsinchu (TW)

(72) Inventors: Yu-Lin Chu, Hsinchu (TW); Chin-Yuan Ko, Hsinchu (TW); Hsi-Yu Kuo, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 248 days.

(21) Appl. No.: 14/814,310

(22) Filed: Jul. 30, 2015

(65) Prior Publication Data

US 2017/0033557 A1 Feb. 2, 2017

(51) Int. Cl.
*H02H 9/04* (2006.01)

(52) U.S. Cl.
CPC .................................. *H02H 9/046* (2013.01)

(58) Field of Classification Search
CPC .......... H02H 9/045; H02H 9/04; H02H 9/041; H02H 9/046

USPC .......................................................... 361/56
See application file for complete search history.

(56) References Cited

U.S. PATENT DOCUMENTS

| | | | | |
|---|---|---|---|---|
| 5,978,192 A | * | 11/1999 | Young | H02H 9/046 361/111 |
| 7,405,915 B2 | * | 7/2008 | Choi | H01L 27/0285 361/111 |
| 2007/0091530 A1 | * | 4/2007 | Chen | H02H 9/046 361/111 |
| 2010/0315748 A1 | * | 12/2010 | Kwong | H03K 19/00315 361/56 |
| 2015/0162746 A1 | * | 6/2015 | Ikeda | H02H 9/046 361/56 |
| 2016/0020603 A1 | * | 1/2016 | Parthasarathy | H02H 9/005 361/56 |
| 2016/0087423 A1 | * | 3/2016 | Chen | H02H 9/046 361/56 |

* cited by examiner

*Primary Examiner* — Dharti Patel
(74) *Attorney, Agent, or Firm* — Maschoff Brennan

(57) ABSTRACT

An electronic device is disclosed that includes an output device and a detection circuit. The output device is coupled to an output pad, and is turned on according to a protection signal. The detection circuit is configured to detect a voltage level of a control node, to generate the protection signal based on the detected voltage level, and to switch the voltage level to a predetermined voltage level according to the detected voltage level.

20 Claims, 4 Drawing Sheets

US 9,979,184 B2

PROTECTION CIRCUIT FOR OUTPUT DEVICE

BACKGROUND

Output devices are utilized to provide a high driving ability of integrated circuits. For example, driving stages that include operational amplifiers, are used to increase the driving ability of analog circuits. However, in many situations, output devices are coupled between output pads and the integrated circuits. The output devices suffer over-stress voltage, such as electrostatic discharge (ESD) pulses, from the output pads. As a result, a permanent damage on the output devices may result, and the operations of overall devices could fail.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
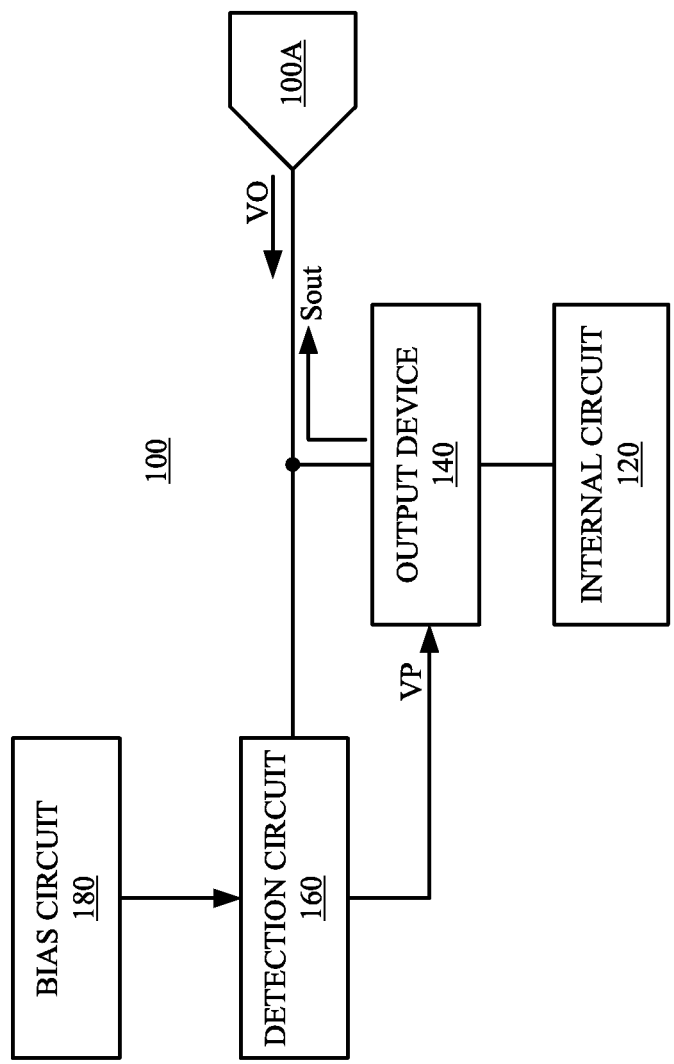
FIG. 1 is a schematic block diagram of an electronic device, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

FIG. 1 is a schematic block diagram of an electronic device 100, in accordance with some embodiments of the present disclosure.

As illustratively shown in FIG. 1, the electronic device 100 includes an internal circuit 120, an output device 140, a detection circuit 160, and a bias circuit 180. The internal circuit 120 is coupled to the output device 140. The output device 140 is configured to transmit an output signal Sout from the internal circuit 120 to an output pad 100A. The output pad 100A is configured to be connected to external devices, including, for example, testing machines, oscilloscopes, etc.

In some embodiments, the internal circuit 120 includes at least one active circuit. For example, in some embodiments, the internal circuit 120 includes at least one analog circuit, such as an amplifier, a mixer, a radio frequency circuit, etc., or the combination thereof. In various embodiments, the internal circuit 120 includes at least one mixed-signal circuit, such as a digital-to-analog-converter (DAC), or a circuit implemented with the combination of aforementioned active circuits.

In some embodiments, the output device 140 is configured to operate as a driver stage of the internal circuit 120. For illustration, in some embodiments, the output device 140 includes a transistor with large size, for example, a power transistor, in which the size of the transistor is set to be sufficient to drive an output load coupled to the output pad 100A. In some other embodiments, the output device 140 includes a push-pull amplifier. For example, the output device 140 is configured to increase an output power of the output signal Sout from the internal circuit 120. Effectively, driving ability of the internal circuit 120, for driving the output load coupled to the output pad 100A, is increased by the output device 140.

The detection circuit 160 is coupled to the output pad 100A. The detection circuit 160 is configured to sense a voltage VO from the output pad 100A. The detection circuit 160 is further configured to generate a protection signal VP to turn on the output device 140 according to the voltage VO. In some embodiments, the voltage VO is generated according to an electrostatic discharge (ESD) event. In various embodiments, the detection circuit 160 is enabled by the voltage VO.

The bias circuit 180 is coupled to the detection circuit 160. The bias circuit 180 is configured to bias the detection circuit 160, so that the detection circuit 160 is normally off. For illustration, in normal operation, the detection circuit 160 is normally off. When an electrostatic discharge (ESD) event occurs from the output pad 100A, the voltage VO is generated, and thus the detection circuit 160 is enabled. Accordingly, the detection circuit 160 generates the protection signal VP. The output device 140 is turned on according to the protection signal VP, in order to bypass an ESD current caused from the ESD event. As a result, reliability of the output device 140 is improved.

The arrangements of the electronic device 100 in FIG. 1 are given for illustrative purposes. Various arrangements of the electronic device 100 are within the contemplated scope of the present disclosure.

Various embodiments related to the electronic device 100 are described below with reference to FIG. 2 and FIG. 3. The present disclosure is not limited to the following embodiments. Other embodiments are within the contemplated scope of the present disclosure.

Figure 2:
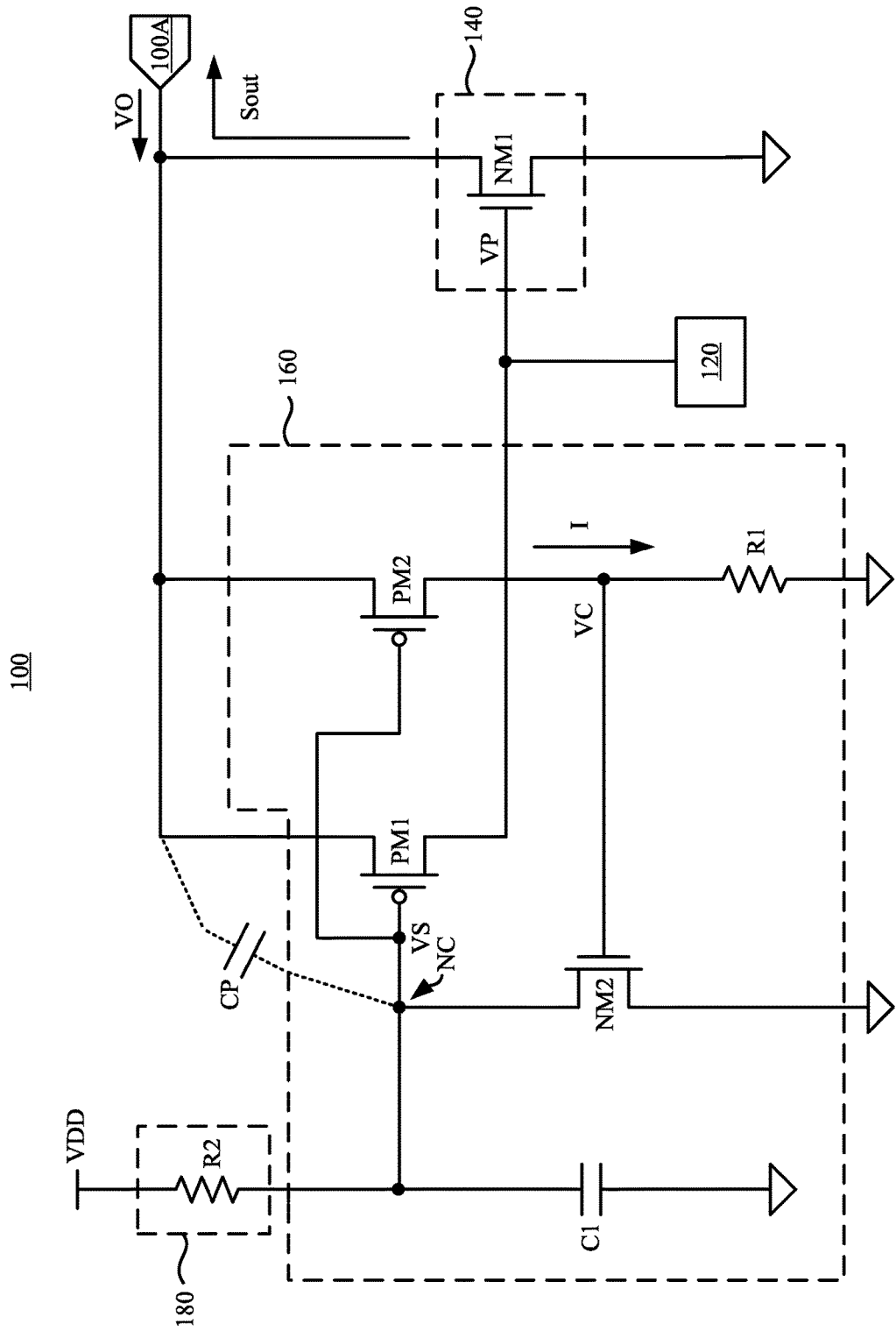
FIG. 2 is a circuit diagram of the electronic device in FIG. 1, in accordance with some embodiments of the present disclosure.

Reference is now made to FIG. 2. FIG. 2 is a circuit diagram of the electronic device 100 in FIG. 1, in accordance with some embodiments of the present disclosure.

For simplicity, the output device 140 of the electronic device 100 in FIG. 1 is illustrated as a switch NM1 in FIG. 2. A first terminal of the switch NM1 is coupled to the output pad 100A, a second terminal of the switch NM1 is coupled to ground, and a control terminal of the switch NM1 is configured to receive the protection signal VP and is coupled to an output terminal of the internal circuit 120. As illustratively shown in FIG. 2, the detection circuit 160 includes a switch PM1, a switch PM2, a switch NM2, a resistive device and a capacitive device. For illustration, the resistive device is implemented by a resistor R1, and the capacitive device is implemented by a capacitor C1.

The resistor R1 and the capacitor C1 are given for illustrative purposes. Various components to implement the resistive device and the capacitive device are within the contemplated scope of the present disclosure. For example, in some embodiments, the capacitive device is implemented by a MOS capacitor, a metal-insulator-metal (MIM) capacitor, or a metal-oxide-metal (MOM) capacitor. Moreover, in some embodiments, the resistive device is implemented by a diode-connected MOSFET, a polysilicon resistor, or a diffusion resistor.

A first terminal of the switch PM1 is coupled to the output pad 100A. A second terminal of the switch PM1 is configured to generate the protection signal VP to the control terminal of the switch NM1. A control terminal of the switch PM1 is coupled to a control node NC which is coupled to the output pad 100A, in order to sense the voltage VO from the output pad 100A. A first terminal of the capacitor C1 is coupled to the control node NC, and a second terminal of the capacitor C1 is coupled to ground. The voltage level of the control node NC varies with the voltage VO from the output pad 100A through a parasitic capacitance CP, which is coupled between the first terminal and the control terminal of the switch PM1.

In some embodiments, the switch PM1 and the capacitor C1 are configured to operate together as a detection unit. The detection unit is able to generate a sensing voltage VS according to the voltage VO which is coupled through the parasitic capacitance CP to the control node NC. The detection unit is then able to generate the protection signal VP to turn on the output device 140 when the voltage level of the sensing voltage VS is lower than the voltage VO.

Furthermore, in some embodiments, the capacitor C1 and the parasitic capacitance CP are configured to operate together as a voltage divider. The voltage divider is able to operatively divide the voltage VO from the output pad 100A to generate the sensing voltage VS. Alternatively stated, the voltage level of the control node NC, i.e., the voltage level of the sensing voltage VS, is determined by the voltage VO through both of the capacitor C1 and the parasitic capacitance CP.

A first terminal of the switch PM2 is coupled to the output pad 100A. A second terminal of the switch PM2 is coupled to a first terminal of the resistor R1. A control terminal of the switch PM2 is coupled to the control node NC to receive the sensing voltage VS. The first terminal of the resistor R1 is configured to output a control signal VC, and a second terminal of the resistor R1 is coupled to ground. A first terminal of the switch NM2 is coupled to the control node NC, a second terminal of the switch NM2 is coupled to ground, and a control terminal of the switch NM2 is coupled to the first terminal of the resistor R1 to receive the control signal VC.

The switch PM2 is configured to generate a current I according to the sensing voltage VS. The resistor R1 is configured to convert the current I to the control signal VC. The switch NM2 is configured to pull the voltage level of the sensing voltage VS to a predetermined voltage level. In various embodiments, the switch PM2, the switch NM2, and the resistor R1 operate as a positive feedback mechanism, such that the voltage level of the sensing voltage VS is able to be quickly pull to the predetermined voltage level. For illustration, in some embodiments, the predetermined voltage level is a reference voltage level of ground. When the sensing voltage VS is decreased, the switch PM2 is slightly turned on to generate the current I1. Accordingly, the control signal VC is generated by the resistor R1, and the switch NM2 is slightly turned on. The control node NC is thus pulled to ground through the switch NM2. As a result, the voltage level of the sensing voltage VS is switched to the reference voltage level of ground, and the switch PM1 is able to be further turned on to output the protection signal VP.

In some embodiments, the switch PM2 is designed to be a replica of the switch PM1. For illustration, the switches PM1-PM2 are configured to have a same size, and the switches PM1-PM2 are disposed adjacent to each other. As a result, a similar process variation are presented in each of the switches PM1-PM2, and thus the switches PM1-PM2 are able to generate a similar changing trend in response to the sensing voltage VS.

In various embodiments, when the switch PM2 is slightly turned on, the switch PM2 is sufficient to generate or transmit a portion of a signal from its first terminal or second terminal to another. Alternatively sated, when the switch PM2 is slightly turned on, the resistance value of the switch PM2 is lower to be sufficient to propagate at least a portion of the signal through the switch PM2. In various embodiments, when the switch PM2 is fully turned on, the switch PM2 is sufficient to generate or transmit a complete signal from its first terminal or second terminal to another. In other words, when the switch PM2 is fully turned on, the resistance value of the switch PM2 are lowest, and thus the signal is allowed to propagate through the switch PM2.

In some embodiments, the switches PM1-PM2 and the switches NM1-NM2 are implemented with different types of transistors. For illustration, in some embodiments, the switches PM1-PM2 and the switches NM1-NM2 are implemented with metal oxide semiconductor field effect transistors (MOSFETs). In some embodiments, the switches PM1-PM2 and the switches NM1-NM2 are implemented with bipolar junction transistors (BJTs). For illustrative purposes only, the switches PM1-PM2 and the switches NM1-NM2 are shown as MOSFETs in FIG. 2. Various types of transistors implementing the switches PM1-PM2 and the switches NM1-NM2 are within the contemplated scope of the present disclosure.

The bias circuit 180 is coupled to the control node NC. The bias circuit 180 is configured to bias the switch PM1 and the switch PM2. The switch PM1 and the switch PM2 are biased to be normally off, such that the operations of the internal circuit 120 and the output device 140 are not affected by the switch PM1 and the switch PM2. In some embodiments, the bias circuit 180 includes a resistor R2. A first terminal of the resistor R2 is configured to receive a system voltage VDD, and the second terminal of the resistor R2 is coupled to the control node NC, which is coupled to the control terminal of the switch PM1 and the control terminal of the switch PM2. A resistance value of the resistor R2 is determined to keep the switch PM1 and the switch PM2 being normally off according to the system voltage VDD. For illustration, the system voltage VDD is about 5 Volts, and the resistance value of the resistor R2 ranges from about 1 kilo ohms to about 10 kilo ohms.

The resistor R2 is given for illustrative purposes. Various components to implement the resistor R2 are within the contemplated scope of the present disclosure. For example, in some embodiments, the resistor R2 is implemented by a diode-connected MOSFET, a polysilicon resistor, or a diffusion resistor.

In some embodiments, the capacitance value of the capacitor C1 is determined according to the system voltage VDD and the voltage VO from the output pad 100A when the ESD event occurs. For illustration, the system voltage VDD is about 5 Volts, and the voltage VO from the output pad 100A when the ESD event occurs is equal to or higher than the system voltage VDD. The capacitance value of the capacitor C1 is determined to generate the sensing voltage VS, in which a voltage difference between the sensing voltage VS and the voltage VO from the output pad 100A is sufficient to turn on the switch PM2. As a result, the switch PM2 is able to be turned on to generate the current I.

The arrangements of the bias circuit 180 in FIG. 2 and the resistance value of the resistor R2 are given for illustrative purposes. Various arrangements of the bias circuit 180 and various resistance values of the resistor R2 are within the contemplated scope of the present disclosure.

Figure 3:
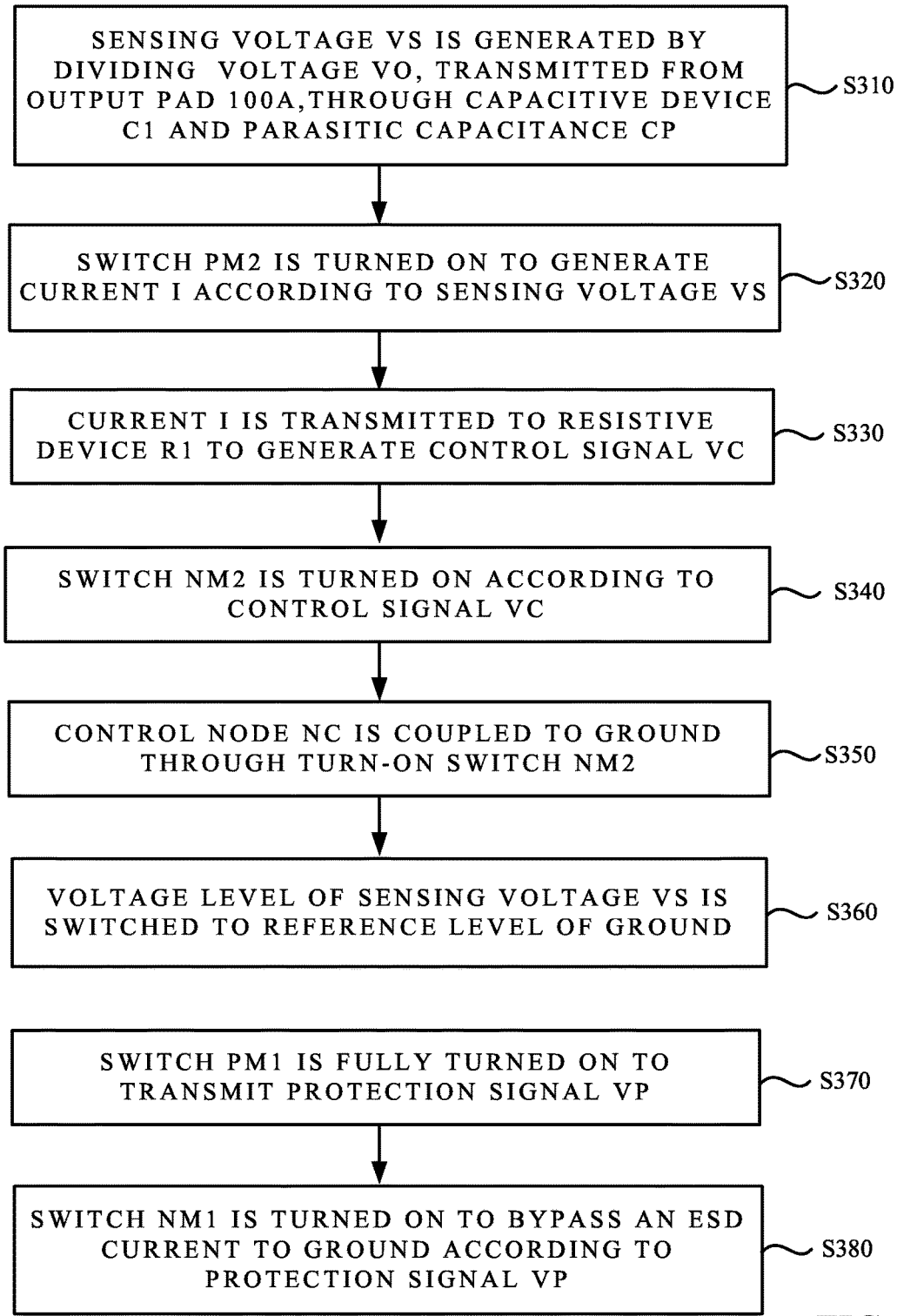
FIG. 3 is a flow chart of a protection method illustrating operations of the electronic device in FIG. 2, in accordance with some embodiments of the present disclosure.

Reference is now made to both of FIG. 2 and FIG. 3. FIG. 3 is a flow chart of a protection method 300 illustrating operations of the electronic device 100 in FIG. 2, in accordance with some embodiments of the present disclosure.

As illustratively shown in FIG. 3, the protection method 300 includes operations S310, S320, S330, S340, S350, S360, S370, and S380. In operation S310, the sensing voltage VS is generated by dividing the voltage VO, which is generated corresponding to an ESD event, transmitted from the output pad 100A, using the capacitor C1 and the parasitic capacitance CP.

For illustration, when the ESD event occurs from the output pad 100A, the voltage VO of the output pad 100A is generated. In some circumstances, the ESD event occurs when the output pad 100A is in contact with other circuits, a human body, or a testing machine, for example. As mentioned above, the voltage VO is coupled to the control node NC through the parasitic capacitance CP, and is divided through the capacitor C1 and the parasitic capacitance CP to generate the sensing voltage VS. Alternatively stated, the voltage level of the control node NC varies in response to ESD events occurring from the output pad 100A.

In operation S320, the switch PM2 is turned on to generate the current I according to the sensing voltage VS. For illustration, when the ESD event occurs from the output pad 100A, the sensing voltage VS becomes lower. Accordingly, the switch PM2 is slightly turned on to generate the current I.

In operation S330, the current I is transmitted to the resistor R1 to generate the control signal VC. In operation S340, the switch NM2 is turned on according to the control signal VC. For illustration, as mentioned above, the switch PM2 is normally off, and thus the voltage level of the control signal VC is at the reference voltage level of ground. When the ESD event occurs from the output pad 100A, the sensing voltage VS becomes lower, and thus the switch PM2 is turned on according to the sensing voltage VS. The voltage level of the control signal VC is increased due to the current I generated from the turn-on switch PM2. Accordingly, the voltage level of the control signal VC is increased. The switch NM2 is thus slightly turned on.

In operation S350, the control node NC is coupled to ground through the turn-on switch NM2. In operation S360, the voltage level of the sensing voltage VS is switched to the reference level of ground. In operation S370, the switch PM1 is fully turned on to transmit the protection signal VP. In operation S380, the switch NM1 is turned on to bypass an ESD current to ground according to the protection signal VP.

For illustration, as mentioned above, the switch NM2 is slightly turned on when the ESD event occurs from the output pad 100A. The control node NC is thus coupled to ground through the switch NM2, and the control node NC is pulled down to ground through the switch PM2. Accordingly, the voltage level of the sensing voltage VS is switched to the reference voltage level of ground. Thus, the switch PM1 is turned on to transmit the voltage of the output pad 100A, i.e., the protection signal VP, which is a high voltage during the ESD event occurs. The switch NM1 is thus turned on by the protection signal VP, and the ESD current caused by the ESD event is bypassed to ground. In other words, the voltage VO from the output pad 100A would not damage the control terminal of the switch NM1. As a result, reliability of the electronic device 100 is improved.

In some embodiments, the operations S320-S370 are operated as a positive feedback mechanism. Through this positive feedback mechanism, the output device 140 is able to be efficiently turned on when the ESD event occurs. For illustration, as mentioned above, when the ESD event occurs from the output pad 100A, the sensing voltage VS is decreased to slightly turn on the switch PM2. The switch PM2 thus generates the current I with an initial current value. The control signal VC with an initial voltage level is thus generated according to the current I with the initial current value. Accordingly, the switch NM2 is slightly turned on to pull down the control node NC to ground. Thus, the sensing voltage VS is further decreased, and the voltage difference between the sensing voltage VS and the voltage from the output pad 100A is increased. Thus, the switch PM2 is further turned on, and the resistance of the switch NM2 is decreased to generate the higher current I. Accordingly, the voltage level of the control signal NC is increased, and the switch NM2 is further turned on. As a result, the voltage level of the control node NC is able to be switched to the reference level of ground in a much shorter period. Alternatively stated, through the positive feedback mechanism, the time interval of the control node NC being fully pulled down to ground is shortened, and thus the switch NM1 is able to be instantly turned on when the ESD event occurs.

The above illustrations include exemplary operations, but the operations are not necessarily performed in the order shown. Operations may be added, replaced, changed order, and/or eliminated as appropriate, in accordance with the spirit and scope of various embodiments of the present disclosure.

Figure 4:
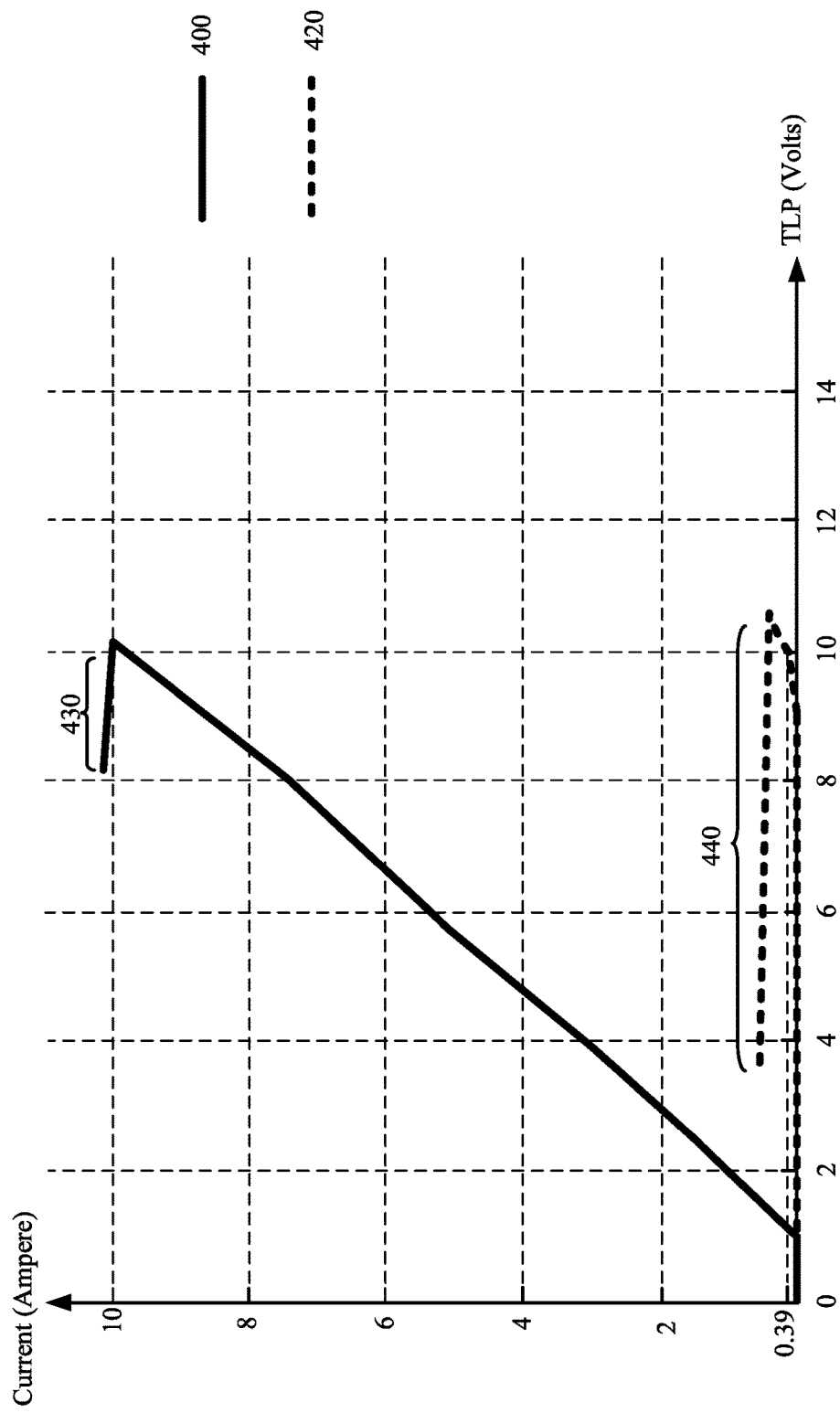
FIG. 4 is a graph illustrating a current-voltage (I-V) curve of the switch NM1 in FIG. 2 and an I-V curve of the switch NM1 in FIG. 2 without any protection from other circuits, in accordance with some embodiments of the present disclosure.

Reference is now made to FIG. 4. FIG. 4 is a graph illustrating a current-voltage (I-V) curve 400 of the switch NM1 in FIG. 2 and an I-V curve 420 of the switch NM1 in FIG. 2 without any protection from other circuits, in accordance with some embodiments of the present disclosure. The I-V curves 400 and 420 illustrated in FIG. 4 are explained below with reference to the electronic device 100 in FIG. 2.

In FIG. 4, the I-V curve 400 of the switch NM1 in FIG. 2 is tested by applying a transmission line pulse (TLP) to the output pad 100A, in which, in this embodiment, the area of the switch NM1 is about 9600 square micrometers ($\mu m^2$). As shown in FIG. 4, x-axis of the graph in FIG. 4 is the voltage level of the transmission line pulse, and the y-axis of the graph in FIG. 4 is the corresponding current of the switch NM1.

As illustrated in the I-V curve 400, in some embodiments, when the voltage level of the transmission line pulse is about 10 Volts, the switch NM1 is able to sustain about 10 Amperes before suffering a breakdown (labeled as 430). In some approaches, the switch NM1 with same cell size is operated without any protection from other circuits, for example, the detection circuit 160, is also tested by applying the same transmission line pulse, and its performance is illustrated as the I-V curve 420. According to the I-V curve 420, without the protection from other circuits, when the voltage of the transmission line pulse is about 10 Volts, the switch NM1 is able to sustain about 0.39 Amperes before suffering a breakdown (labeled as 440). In other words, with the arrangements illustrated in FIG. 2, the reliability of the switch NM1 is effectively improved by about more than about 25 ($\approx 10/0.39$) times.

In some approaches, a ballast resistive device is employed to protect integrated circuits from ESD pulses. For example, the cell area of the ballast resistive device is configured to be sufficient to distribute the ESD pulses. However, the cell area of the ballast resistive device is large, and the ballast resistive device is required to be implemented using resistor protection oxide (RPO) layer with an extra mask. As a result, the overall cost of such arrangement is significantly increased. In addition, the performance of the integrated circuits is reduced due to extra loading of the ballast resistive device.

Compared with the protection circuit using the ballast resistive device in other approaches, the electronic device 100 of the present disclosure is able to be implemented without the extra mask, because the electronic device 100 utilizes the switches, the resistive device, and the capacitive device that are able to be implemented with common semiconductor layers. Moreover, the cell area of the detection circuit 160 is relatively lower than the cell area of the ballast resistive device in the other approaches, and the operations of the output device 140 is not affected by the detection circuit 160, because the switch NM1 operates without extra loading and the detection circuit 160 is enabled by the voltage VO. As a result, the overall cost and the performance of the electronic device 100 are improved.

As described above, the electronic device and the protection method of the present disclosure are able to detect whether the ESD event occurs from the output pad, and to turn off the output device accordingly. The electronic device is able to generate the protection signal through the positive feedback mechanism, in which the positive feedback mechanism and the output device are able to be implemented without extra masks. Accordingly, the electronic device is able to quickly output the protection signal when the ESD event occurs, and the cost of the electronic device is saved. As a result, the cost and the reliability of overall system are improved.

In this document, the term "coupled" may also be termed as "electrically coupled," and the term "connected" may be termed as "electrically connected". "Coupled" and "connected" may also be used to indicate that two or more elements cooperate or interact with each other.

In some embodiments, an electronic device is disclosed that includes an output device, and a detection circuit. The output device is coupled to an output pad, and is turned on according to a protection signal. The detection circuit is configured to detect a voltage level of a control node, and to generate the protection signal based on the detected voltage level, and to switch the voltage level to a predetermined voltage level according to the detected voltage level.

Also disclosed is an electronic device that includes an output device, and a detection circuit. The output device is coupled to an output pad. The detection circuit is configured to generate a sensing voltage in response to an ESD event occurring from the output pad, and to increase a voltage level of a control signal according to the sensing voltage. The detection circuit is configured to turn on the output device according to the control signal.

Also disclosed is a method for protecting an output device configured to be turned on according to a protection signal, and the method includes the operations below. A voltage level of a control node coupled to an output pad is detected through a first switch of a detection circuit. The voltage level is switched to a predetermined voltage level by the detection circuit according to the voltage level. A protection signal is generated by the first switch to turn on the output device based on the detected voltage level.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic device, comprising:
   an output device coupled to an output pad, and turned on according to a protection signal; and
   a detection circuit configured to detect a voltage level of a control node which is capacitively coupled to the output pad, and to generate the protection signal in response to a first voltage at the control node, and to switch the voltage level to a predetermined voltage level according to the detected voltage level, wherein the first voltage is capacitively generated from a second voltage, at the output pad, corresponding to an electrostatic discharge (ESD) event.

2. The electronic device of claim 1, wherein the detection circuit comprises:
   a voltage divider configured to divide the second voltage from the output pad to the control node, so as to detect the voltage level at the control node; and
   a switch configured to be selectively turned on according to the detected voltage level.

3. The electronic device of claim 2, wherein the voltage divider is configured to receive the second voltage through a parasitic capacitance of the switch.

4. The electronic device of claim 2, wherein the voltage divider comprises:

a capacitive device coupled between the control node and ground.

5. The electronic device of claim 2, wherein a first terminal of the switch is coupled to the output pad, a second terminal of the switch is configured to output the protection signal, and a control terminal of the switch is coupled to the control node.

6. The electronic device of claim 1, wherein the detection circuit comprises:
   a first switch configured to generate a current according to the detected voltage level;
   a resistive device configured to generate a control signal according the current; and
   a second switch configured to switch the voltage level of the control node to the predetermined voltage level according to the control signal.

7. The electronic device of claim 6, wherein a first terminal of the first switch is coupled to the output pad, a second terminal of the first switch is coupled to ground through the resistive device, a control terminal of the first switch is coupled to the control node, a first terminal of the second switch is coupled to the control node, a second terminal of the second switch is coupled to ground, and a control terminal of the second switch is coupled to the resistive device to receive the control signal.

8. The electronic device of claim 1, further comprising:
   a bias circuit configured to bias the detection circuit.

9. An electronic device, comprising:
   an output device coupled to an output pad; and
   a detection circuit configured to generate a sensing voltage at a control node, which is capacitively coupled to the output pad, in response to an electrostatic discharge (ESD) event occurring from the output pad, and to increase a voltage level of a control signal according to the sensing voltage,
   wherein the detection circuit is configured to turn on the output device according to the control signal, and the output device is turned on if the sensing voltage is capacitively generated from a voltage, at the output pad, corresponding to the electrostatic discharge (ESD) event.

10. The electronic device of claim 9, wherein the detection circuit comprises:
    a first switch configured to be turned on according to the sensing voltage.

11. The electronic device of claim 10, wherein the detection circuit further comprises:
    a voltage divider configured to generate the sensing voltage through the first switch and the output pad.

12. The electronic device of claim 11, wherein the voltage divider comprises:
    a capacitive device coupled between a control terminal of the first switch and ground.

13. The electronic device of claim 10, wherein a first terminal of the first switch is coupled to the output pad, a second terminal of the first switch is coupled to the output device, and the detection circuit further comprises:
    a second switch, a first terminal of the second switch being coupled to the output pad, and a control terminal of the second switch being coupled to a control terminal of the first switch to receive the sensing voltage;
    a first resistive device coupled between a second terminal of the second switch and ground; and
    a third switch, a first terminal of the third switch being coupled to the control terminal of the first switch, a second terminal of the third switch being coupled to ground, and a control terminal of the third switch being coupled to the second terminal of the second switch.

14. The electronic device of claim 13, further comprising:
    a second resistive device, a first terminal of the second resistive device being configured to receive a system voltage, and a second terminal of the second resistive device being coupled to the control terminal of the first switch.

15. The electronic device of claim 9, wherein the detection circuit is configured to generate a current according to the sensing voltage, and to convert the current to the control signal.

16. The electronic device of claim 15, wherein the detection circuit comprises:
    a first switch configured to generate the current according to the sensing voltage;
    a resistive device configured to generate the control signal according to the current; and
    a second switch configured to enable the detection circuit to turn on the output device according to the control signal.

17. A method for protecting an output device, the output device being configured to be turned on according to a protection signal, the method comprising:
    detecting a voltage level of a control node, the control node being capacitively coupled to an output pad;
    switching the voltage level to a predetermined voltage level, by a detection circuit, according to the detected voltage level; and
    generating the protection signal, by a first switch of the detection circuit, in response to a first voltage at the control node to turn on the output device, wherein the first voltage is capacitively generated from a second voltage, at the output pad, corresponding to an electrostatic discharge (ESD) event.

18. The method of claim 17, wherein detecting the voltage level of the control node comprises:
    dividing the second voltage from the output pad to the control node, by a first capacitive device of the detection circuit, so as to detect the voltage level.

19. The method of claim 17, wherein switching the voltage level to the predetermined voltage level comprises:
    generating a current, by a second switch of the detection circuit, according to the detected voltage level;
    generating a control signal, by a resistive device, according to the current; and
    pulling the voltage level of the control node to ground, by a third switch of the detection circuit, according to the control signal.

20. The method of claim 19, wherein generating the protection signal comprises:
    turning on the first switch according to the detected voltage level to generate the protection signal.

\* \* \* \* \*